US012475212B2

(12) United States Patent
Zeng et al.

(10) Patent No.: US 12,475,212 B2
(45) Date of Patent: Nov. 18, 2025

(54) PROTOCOL AND SYSTEM FOR TEE-BASED AUTHENTICATING AND EDITING OF MOBILE-DEVICE CAPTURED VISUAL AND AUDIO MEDIA

(71) Applicant: TruePic Inc., San Diego, CA (US)

(72) Inventors: Thomas Meng-Tao Zeng, San Diego, CA (US); Oliver Rice, Huntsville, AL (US); Chi Shing Chan, San Diego, CA (US); Sherif Hanna, Carlsbad, CA (US)

(73) Assignee: TruePic Inc., San Diego, CA (US)

( * ) Notice: Subject to any disclaimer, the term of this patent is extended or adjusted under 35 U.S.C. 154(b) by 385 days.

(21) Appl. No.: 18/349,359

(22) Filed: Jul. 10, 2023

(65) Prior Publication Data

US 2023/0351011 A1   Nov. 2, 2023

Related U.S. Application Data

(63) Continuation of application No. 17/468,842, filed on Sep. 8, 2021, now Pat. No. 11,741,219.

(60) Provisional application No. 63/075,370, filed on Sep. 8, 2020.

(51) Int. Cl.
| | |
|---|---|
| *G06F 21/50* | (2013.01) |
| *G06F 21/00* | (2013.01) |
| *G06F 21/57* | (2013.01) |
| *G06F 21/64* | (2013.01) |
| *G06F 21/85* | (2013.01) |
| *H04N 21/414* | (2011.01) |

(52) U.S. Cl.
CPC ............. *G06F 21/50* (2013.01); *G06F 21/00* (2013.01); *G06F 21/57* (2013.01); *G06F 21/64* (2013.01); *G06F 21/85* (2013.01); *H04N 21/41407* (2013.01)

(58) Field of Classification Search
CPC .......... G06F 21/50; G06F 21/00; G06F 21/57; G06F 21/64; G06F 21/85; H04N 21/41407; H04N 21/4223; H04N 21/44008; H04N 21/64715; H04N 21/8153; H04N 21/835; H04N 21/8352; H04N 21/85406
See application file for complete search history.

(56) References Cited

U.S. PATENT DOCUMENTS

| | | | |
|---|---|---|---|
| 7,120,252 B1 | 10/2006 | Jones | |
| 11,250,808 B2 | 2/2022 | Galluzzi | |
| 2011/0243458 A1 | 10/2011 | Yoshioka | |
| 2012/0102557 A1 | 4/2012 | Felton | |
| 2015/0052325 A1* | 2/2015 | Persson | ............... G06F 12/1433 |
| | | | 711/163 |

(Continued)

*Primary Examiner* — Lynn D Feild
*Assistant Examiner* — Ethan V Vo
(74) *Attorney, Agent, or Firm* — Sheppard Mullin Richter & Hampton LLP

(57) ABSTRACT

In general, one aspect disclosed features a media asset capture and processing method, implemented via a computer-based state machine executing on a computer processor, the method comprising: implementing a first phase including media asset capture and frame processing limited to Rich Execution Environment (REE) read-only (RO) frame access; implementing a second phase including processing with REE read-write (RW) frame access; and implementing a third phase including processing with REE read-only (RO) frame access.

20 Claims, 6 Drawing Sheets

(56) References Cited

U.S. PATENT DOCUMENTS

| | | |
|---|---|---|
| 2016/0379330 A1 | 12/2016 | Powers |
| 2017/0024568 A1* | 1/2017 | Pappachan ............... G06F 21/64 |
| 2018/0113817 A1 | 4/2018 | Banginwar |
| 2018/0196937 A1 | 7/2018 | Kwag |
| 2019/0286911 A1 | 9/2019 | Smith |
| 2020/0082279 A1* | 3/2020 | Arora ..................... G06N 3/045 |
| 2020/0177627 A1* | 6/2020 | Tong ................... H04L 63/0457 |
| 2020/0206635 A1* | 7/2020 | Mojarad ............... A63F 13/355 |
| 2020/0234275 A1* | 7/2020 | Zhang ..................... G06F 21/53 |
| 2020/0379923 A1* | 12/2020 | Lidman ................. G06N 3/063 |
| 2022/0046000 A1 | 2/2022 | Lyons |

\* cited by examiner

| | Frame Buffer State | Frame Buffer Access Control | Entrance Criteria | Exit Criteria | Restrictions |
|---|---|---|---|---|---|
| 1 | State 0: Initial State | • Read-only by REE<br>• Readable and Writable by TEE | Sensor outputs raw data and thus creating a new frame buffer object | Two possible exit paths:<br>1. Direct transition to final signing state (State X)<br>2. Indirect transition to REE-RW state | • If REE has valid use cases to transform the frame buffer object, or any its associated meta data, it has to call into some TPF TA to perform the transformation.<br>  • E.g., crop the image<br>• The collection of the TPF TAs offer services to securely implement image transformations |
| 2 | State X: Image finalization | • Read-only by REE<br>• Readable and Writable by TEE | 1. Image is ready to sign<br>2. Meta data is ready to sign | • Success if authenticity verified correctly<br>• Error if authenticity verification failed | • No interference by REE during this state |

FROM FIG. 3A

| | Frame Buffer State | Frame Buffer Access Control | Entrance Criteria | Exit Criteria | Restrictions |
|---|---|---|---|---|---|
| 3 | State 1: REE-RW | • Readable and Writable by REE<br>• Readable and Writable by TEE | 1. TEE has preserved perceptual hash<br>2. TEE has preserved an un-tampered frame, or UTF, with an associated signature covering the UTF. This part is a backup in case the perceptual hash is not mature enough to detect certain types of on-device malicious REE manipulations<br>3. REE calls into TEE to request Write Permission<br>  a. API is "tpf_request_write(frameID)" | 1. REE has finished writing to the frame object<br>2. REE calls into TEE to relinquish Write Permission<br>  a. API is "tpf_release_write(frameID)" | • REE modifications must not change the semantics of the image<br>• REE must observe the time constraints<br>• REE cannot dwell in this state for longer than N seconds, where N is configurable and should not be longer than 2 or 3 seconds |
| 4 | State 2: REE-RO | • Read-only by REE<br>• Readable and Writable by TEE | 1. Previous state is "REE-RW"<br>2. REE calls into TEE to relinquish the Write Permission<br>  a. API is "tpf_release_write(frameID)" | Either goes back to REE-RO state, or to Error state, or to State X, namely the final shining state | • If REE has valid use cases to transform the frame buffer in this state, or any its associated meta data, it has to call into some TPF TA to perform the transformation, or wait until the state has become "REE-RW" |

FIG. 3B

| Transition | From State | To State | Actions and Comments |
|---|---|---|---|
| 1 | State 0 | State X (Finalization) | • Prepare image frame and associated meta data for signing<br>• Frame is never subject to REE modification |
| 2 | State 0 | State 1 (REE-RW) | • REE calls API "tpf_request_write(frameID)" with frame ID matching the ID of this frame buffer object |
| 3 | State 1 (REE-RW) | State 2 (REE-RO) | • REE has done with writing to the frame buffer object<br>• REE calls API "tpf_release_write(frameID)" with frame ID matching the ID of this frame buffer object |
| 4 | State 2 (REE-RO) | State 1 (REE-RW) | • After some processing in State 2 (REE-RO), an use case arises such that the REE again requests write access<br>• REE calls API "tpf_request_write(frameID)" with frame ID matching the ID of this frame buffer object |
| 5 | State 2 (REE-RO) | State X (Finalization) | • TEE has prepared the final image frame and the associated meta data for signing |

FIG. 4

PROTOCOL AND SYSTEM FOR TEE-BASED AUTHENTICATING AND EDITING OF MOBILE-DEVICE CAPTURED VISUAL AND AUDIO MEDIA

CROSS REFERENCE TO RELATED APPLICATIONS

This application is a continuation of U.S. patent application Ser. No. 17/468,842, filed Sep. 8, 2021, entitled "PROTOCOL AND SYSTEM FOR TEE-BASED AUTHENTICATING AND EDITING OF MOBILE-DEVICE CAPTURED VISUAL AND AUDIO MEDIA", which claims priority to U.S. Provisional Patent Application No. 63/075,370, filed Sep. 8, 2020, entitled "PROTOCOL AND SYSTEM FOR TEE-BASED AUTHENTICATING AND EDITING OF MOBILE-DEVICE CAPTURED VISUAL AND AUDIO MEDIA," the disclosures thereof are incorporated by reference herein in their entirety.

FIELD OF THE INVENTION

The disclosed technology relates generally to data communication networks, and more particularly some embodiments relate to managing network devices in such networks.

BACKGROUND

In the mobile environment, such as the Android mobile device environment, the authentication and editing of device-captured media typically occur in the Rich Execution Environment (REE) or in the cloud. The REE is the normal processing environment where the device operating system and applications typically run.

When processing such media in the REE, various security risks are possible. While some of these risks are overcome when such processing occurs in the cloud, this option is not feasible when no network connection is available. These and other problems exist with these cloud-based media authentication approaches.

Digital photography has grown steadily since its introduction. Social networks and mobile computing devices have further accelerated the growth of photographic data made available to the public. The ability to take and share photographs anytime and anywhere has resulted in the general public consuming more photographic data than ever and relying on these photographs for up to the minute information. However, it is a well-known fact that digital photographs are easily edited and the information contained within a digital photograph may not be entirely trustworthy. Thus, obtaining trustworthy evidence based on digital photographs and other electronic images or other media (referred to herein as "media assets") can be challenging due to the use of technology that can alter and compromise the integrity of such media assets.

These and other problems exist with conventional media asset collection and authentication systems.

In general, one aspect disclosed features a media asset capture and processing method, implemented via a computer-based state machine executing on a computer processor, the method comprising: implementing a first phase including media asset capture and frame processing limited to Rich Execution Environment (REE) read-only (RO) frame access; implementing a second phase including processing with REE read-write (RW) frame access; and implementing a third phase including processing with REE read-only (RO) frame access.

Embodiments of the method may include one or more of the following features. Some embodiments comprise preserving perceptual hash during certain state transition of a frame buffer object. Some embodiments comprise validating perceptual hash before returning to certain state of a frame buffer object. Some embodiments comprise validating the elapse time during the REE RW state of the frame buffer object. Some embodiments comprise providing an interface for state transitions and a mechanism to validate authenticity. In some embodiments, the state-machine comprises an access-control mechanism, including at least two states, depending on whether REE requires RO access to frame objects, or RW access to the frame objects. Some embodiments comprise performing media asset authentication in a Trusted Execution Environment (TEE) on the same device where the media is captured. In some embodiments, TEE is a secure, integrity protected processing environment comprising processing, memory and storage devices isolated from the normal processing environment on the device. In some embodiments, the TEE may inspect and approve requests from the REE to transition between states. In some embodiments, in the first phase: the media asset is captured and processed by hardware in a camera pipeline of a capture device; the REE is only permitted to read frame buffer objects according to hardware page table attribute settings; and an output of the first phase comprises earliest viable image (EVI) objects. In some embodiments, performing media asset authentication comprises: generating thumbnail images of the EVI objects; attaching each thumbnail image to the corresponding EVI object; and for each EVI object, attaching metadata to the EVI object, wherein the metadata comprises at least one of data, time, or depth information. In some embodiments, the media asset undergoes a perceptual hash and parameter extraction for parameters including fingerprints of at least some of the important features in the media asset. In some embodiments, the media asset may be subject to depth map processing to detect picture in picture (PiP) to determine if the PiP indicates the media asset is potentially a fake. In some embodiments, in the second phase: the TEE computes the perceptual hash values on the current state of the buffer objects; the TEE updates the hardware page table attributes to give permission to REE to write to the frame buffer objects; an API calls from REE to TEE to set frame objects to the RW state, for a given frame object identification; TEE records the state and timestamp of the frame buffers when REE is granted the write permission; and an output of the second phase comprises an uncompressed, raw image. In some embodiments, TEE preserves the un-tampered media asset until a perceptual hash classification can achieve accurate detection. In some embodiments, in the third phase: REE calls into TEE to close the session and the TEE removes the write permission from REE; TEE conducts security validations, including one or more of: verifying that an elapse time, since granting RW access to REE, is less than a stored threshold, verifying that new frame objects match the perceptual hash values computed in the second phase, and compressing the frame objects in a predetermined format; and when validation fails during a security validation step, the TEE discontinues signature generation and moves the corresponding frame object to an error state to prevent the REE from falsely claiming the media asset to be authentic.

In general, one aspect disclosed features a system, comprising: a hardware processor; and a non-transitory machine-readable storage medium encoded with instructions executable by the hardware processor to perform a media asset capture and processing method, implemented via a computer-based state machine executing on the hardware processor, the method comprising: implementing a first phase including media asset capture and frame processing limited to Rich Execution Environment (REE) read-only (RO) frame access; implementing a second phase including processing with REE read-write (RW) frame access; and implementing a third phase including processing with REE read-only (RO) frame access.

Embodiments of the method may include one or more of the following features. Some embodiments comprise preserving perceptual hash during certain state transition of a frame buffer object. Some embodiments comprise validating perceptual hash before returning to certain state of a frame buffer object. Some embodiments comprise validating the elapse time during the REE RW state of the frame buffer object. Some embodiments comprise providing an interface for state transitions and a mechanism to validate authenticity.

SUMMARY

One aspect of the invention relates to media (e.g., media assets) authentication in a Trusted Execution Environment (TEE) on the same device where the media is captured. A TEE is a secure, integrity protected processing environment (e.g., processing, memory and storage capabilities) isolated from the normal processing environment on a device. This provides greater security as compared with processing in the REE and does not require an internet connection. While embodiments are described with reference to images, the disclosed technology also applies to audio, audio combined with images, video, multimedia and other forms of media assets.

One example of a TEE is known as Trusty, which is a secure Operating System (OS) that provides a Trusted Execution Environment (TEE) for Android. Details of Trusty can be found at https://source.android.com/security/trusty, which is incorporated by reference herein in its entirety. Other TEEs are known.

One application of the present disclosure relates to the challenges faced by the industry to maintain trust that media assets have not been maliciously modified while at the same time continuing to give a REE the freedom to optimize media asset quality and achieve desired effects in software (e.g., Multi Frame Noise Reduction where information from multiple frames are combined to reduce the noise in the final media asset).

According to some embodiments, the invention uses a state-machine-based access-control mechanism, including at least two states, depending on whether REE requires Read-Only (RO) access to frame objects, or Read-Write (RW) Access to the frame objects. Additionally, various mechanisms can be provided (e.g., in the form of APIs and security checking) to transition from one state to another state in a manner that maintains the authenticity of the single final media asset. The TEE may inspect and approve requests from the REE to transition between states. This gives the TEE final control to enforce security access control validation. The REE may communicate to the TEE via a standard interface such as those described in the ARM SMC calling convention.

In some embodiments, this approach ensures that the media output after any processing (e.g., merging, compressing, resizing, and the like) has not been maliciously tampered with.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 3A and FIG. 3B is a table of the design of each state, as well as the transition among the states, according to some embodiments.

FIG. 4 is a table of the design of each state, as well as the transition among the states, according to some embodiments.

The figures are not exhaustive and do not limit the present disclosure to the precise form disclosed.

DETAILED DESCRIPTION

Figure 1:
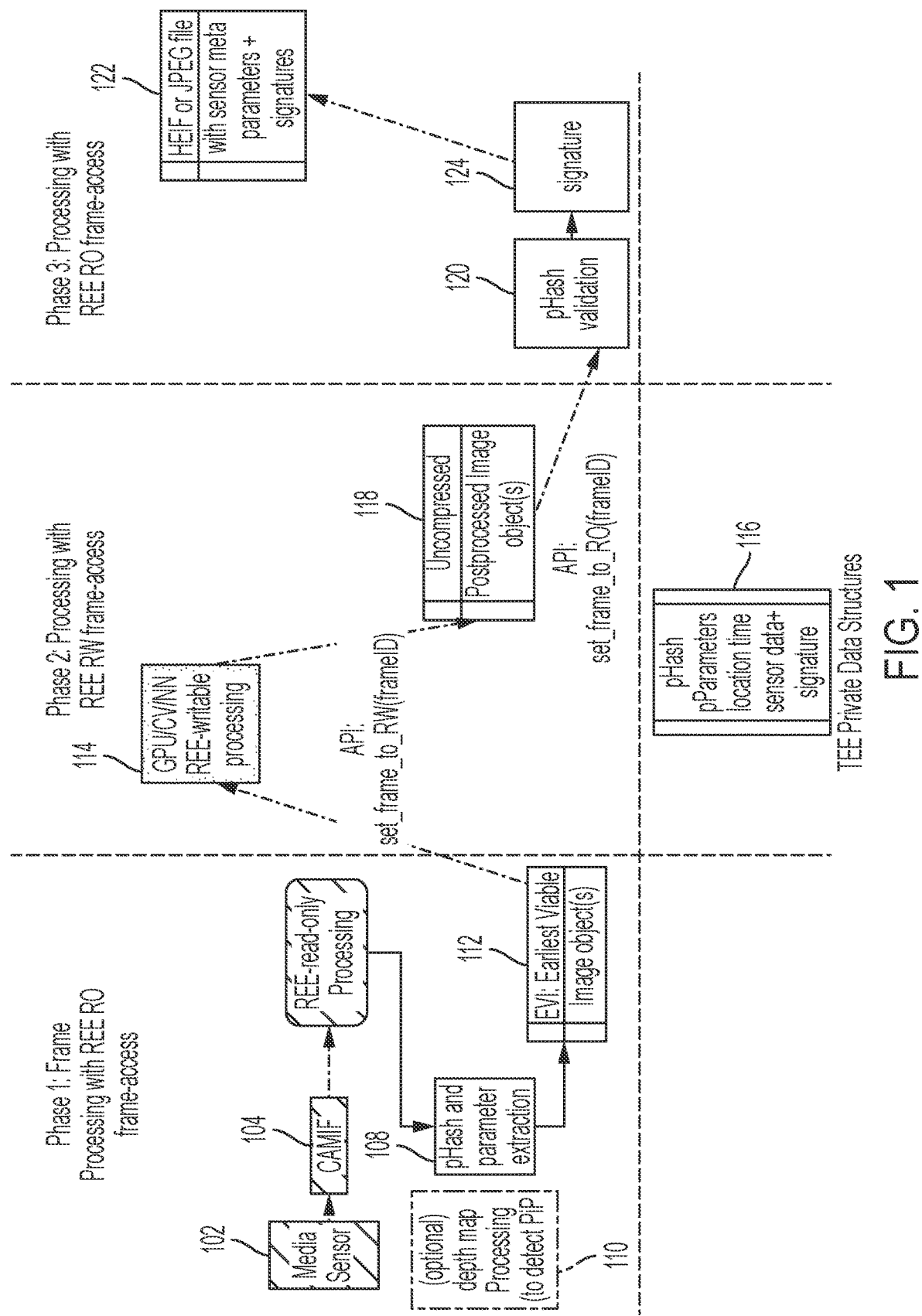
FIG. 1 depicts an example frame buffer processing flow for use in connection with the media asset authentication technique according to some embodiments.

One example of the disclosed technology will be described with respect to reference to FIG. 1, which depicts an example frame buffer processing flow for use in connection with the media asset authentication technique according to some embodiments. The media sensor 102, camera interface (CAMIF) 104, and media asset processor 106 may reside on any suitable media capture device (e.g., a camera, phone, tablet or other imaging device). As shown, the media asset capture and processing may include three phases. Phase 1 may include media asset capture and frame processing limited to REE read only (RO) frame-access. Phase 2 may include processing with REE read-write (RW) frame access. Phase 3 may include processing with REE RO frame-access. At any time, the TEE may read and write the corresponding the captured frame buffer, provided the TEE and the REE do not write at the same time to the same buffer location.

In phase 1 of this example, the media asset is captured and processed by the hardware blocks (e.g., media sensor 102, CAMIF 104) in the camera pipeline (e.g., on a mobile phone, tablet or other imaging device). In this phase, the REE is only allowed to read the frame buffer objects according to hardware page table attribute settings. The hardware blocks implement fixed functions and are therefore trusted because the function blocks are not controlled by the REE. The media asset may undergo a perceptual hash (pHash) and parameter extraction, at 108. Perceptual hashing is the use of an algorithm that produces a snippet or fingerprint of various forms of multimedia. The parameters may include fingerprints of some or all of the important features in the media. Optionally, the media asset may be subject to depth map processing to detect picture in picture (PiP), at 110. Detection of PiP indicates the media asset is potentially a fake. The output of phase 1 may be earliest viable assets 112, for example such as earliest viable image (EVI) objects. The EVI objects may be further processed in Phase 2.

In phase 2, the TEE may update the hardware page table attributes to give permission to REE to also write to the frame buffer objects. But before the permission is granted, TEE first computes the perceptual hash values on the current state of the buffer objects, at 114. TEE may also preserve the un-tampered media asset until the perceptual hash classification can achieve accurate detection. This process may be embodied in an API call from REE to TEE to set frame objects to the RW state, for a given frame object identification. Additionally, TEE records the state and timestamp of the frame buffers when REE is granted the Write Permission. Below the dotted line are shown the properties and state information that the TEE tracks per frame buffer, at 116. The output of phase 2 may be a raw asset, such as a raw image, which may be uncompressed image objects in a format such as YUV, RGB, or similar objects, at 118.

In phase 3 of this example, the REE has completed its work in the current use case that requires RW access to the frame objects. Because REE relies on TEE to sign the final media asset, REE calls into TEE to close the session, otherwise the final output will not count as a verified picture. The TEE may remove the Write Permission from REE, and may conduct the following security validations:

a. Verify that the elapsed time, i.e. the time since granting RW access to REE, is less than a threshold. This prevents REE from coordinating with the cloud to generate a fake media asset, while providing sufficient time for REE to run any on-chip media asset enhancement algorithm.

b. Verify that the new frame objects match the perceptual hash values computed in the phase 2, at 120.

c. Compress the frame objects, for example in a format such as HEIF, JPEG, or the like, at 122.

If validation fails during step 3.a or 3.b, the TEE will NOT continue with signature generation, at 124, and the REE will be prevented from falsely claiming the media asset to be authentic. The TEE will instead move the corresponding frame object to the "Error" state.

Figure 2:
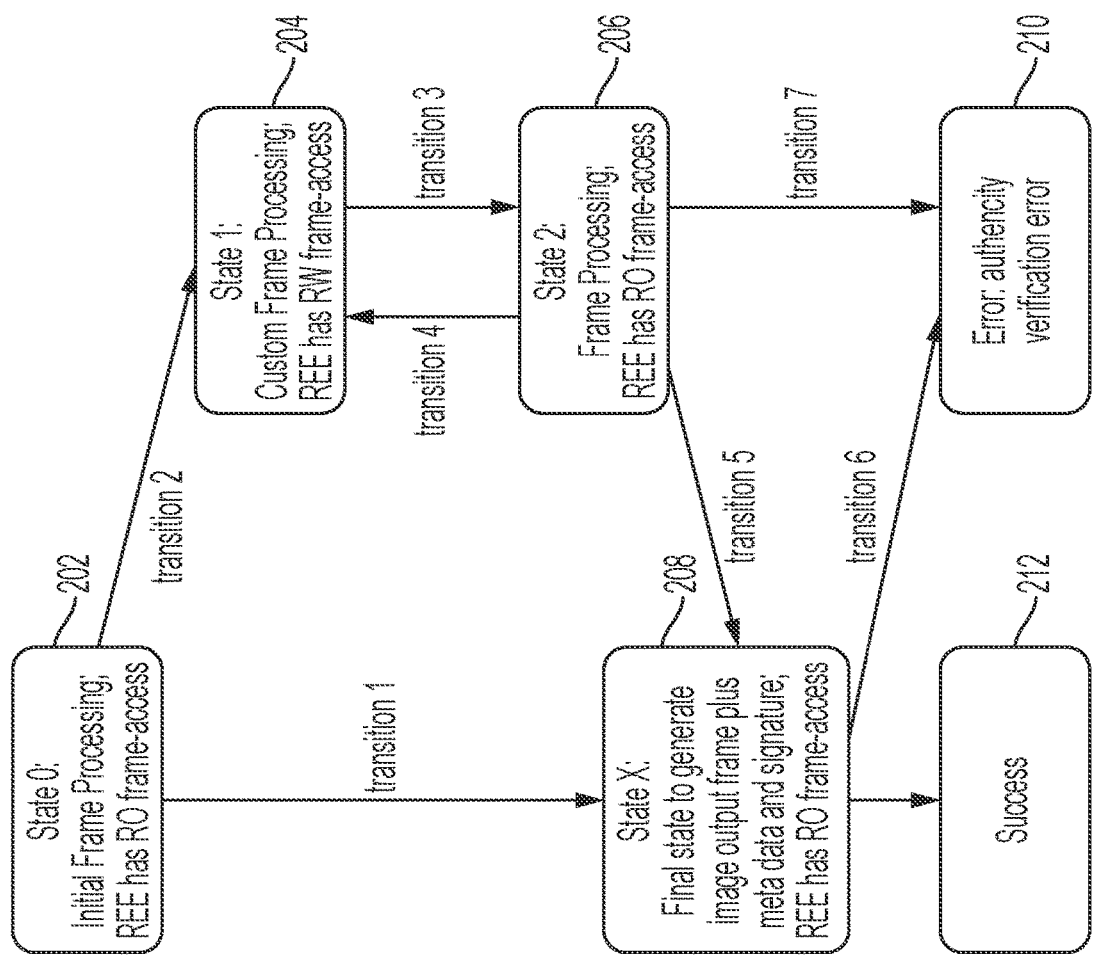
FIG. 2 is a state diagram that further explains the process of FIG. 1 according to some embodiments.

The process is further explained with reference to the state diagram of FIG. 2. The state diagram may be applied to each media asset frame buffer object, starting when the media asset sensor produces the initial raw frame buffer.

As depicted, the various states represent the following.

State 0, at 202, may represent the Initial Frame Processing where the REE has RO frame access.

State 1, at 204, may represent custom frame processing where the REE has RW frame access.

State 2, at 206, may represent frame processing where the REE has RO frame access.

State X, at 208, may represent a final state to generate an media asset output frame plus meta data and signature, where the REE has RO frame access. The signature is generated by using the private key of the TEE to cryptographically sign the data payload, for example image plus metadata.

Error state, at 210, indicating an authenticity verification error.

Success state, at 212.

Details of the design of each state, as well as the transition among the states, are covered in the tables in FIGS. 3A, 3B, and 4. Referring to the state 0 restrictions of FIGS. 3A and 3B, "valid use-case" means a legitimate use case, where there is no attempt to break any security properties or generate a fake property. In state 1, malicious REE manipulations may be detected by comparing before and after perceptual hash values. If they match, there are no malicious manipulations.

One benefit of such a system is the reduced TCB, or Trusted Computing Base, as compared to the REE based solutions.

The proposed mechanism also has the advantage of providing media asset authentication without affecting the REE SW's existing customization to the mobile camera pipeline. Furthermore, the mechanism refines secure camera access control to individual frame buffer objects, regardless of the associated camera identification. Previously, secure camera access control was done at per camera granularity.

Figure 5:
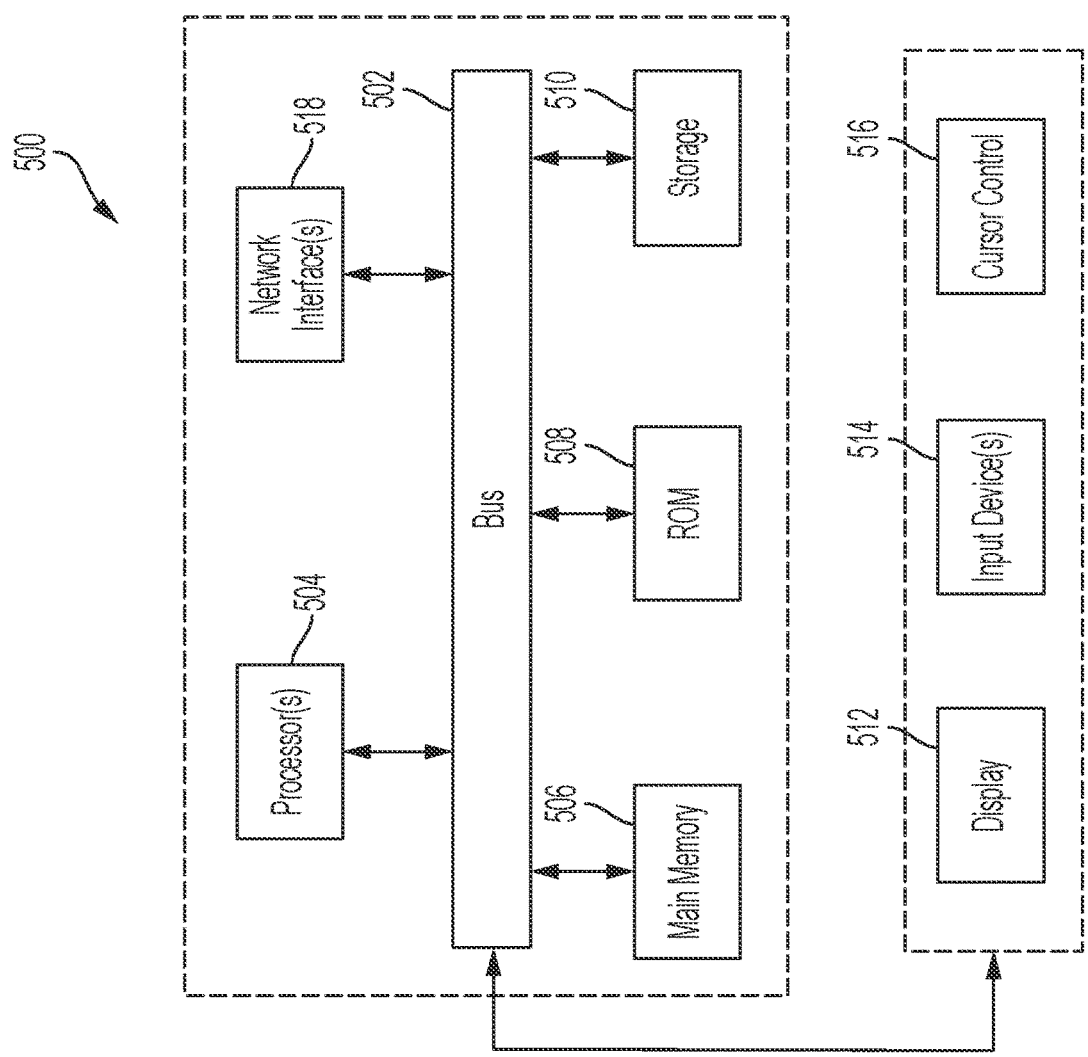
FIG. 5 is an example computing component that may be used to implement various features of embodiments described in the present disclosure.

FIG. 5 depicts a block diagram of an example computer system 500 in which embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a liquid crystal display (LCD) (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

The computer system 500 also includes a communication interface 518 coupled to bus 502. Network interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, network interface 518 may be a local area network (LAN) card to provide a data communication connection to a compatible LAN (or a WAN component to communicate with a WAN). Wireless links may also be implemented. In any such implementation, network interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, or a combination of hardware and software. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 500.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A media asset capture and processing method, implemented by an electronic device, the method comprising:
   capturing a media asset in an electronic device;
   storing frame buffer objects of the captured media asset in a Trusted Execution Environment (TEE) of the electronic device;
   subsequent to storing the frame buffer objects, processing the media asset in a Rich Execution Environment (REE) of the electronic device in a first state with read-only (RO) access to the stored frame buffer objects and a second state with read-write (RW) access to the stored frame buffer objects;
   controlling, in the TEE, the RO and RW access by the REE to the stored frame buffer objects during processing of the media asset; and
   subsequent to processing the media asset, authenticating the processed media asset in the TEE.

2. The method of claim 1, wherein controlling the RO and RW access by the REE to the stored frame buffer objects comprises:
   receiving a first call sent by the REE to grant the RW access to the frame buffer objects to the REE; and
   responsive to the first call, granting the RW access to the stored frame buffer objects to the REE.

3. The method of claim 2, wherein granting the RW access to the stored frame buffer objects to the REE comprises:
   updating a hardware page table attribute.

4. The method of claim 2, wherein controlling the RO and RW access by the REE to the stored frame buffer objects further comprises:
   receiving a second call sent by the REE to withdraw the RW access to the frame buffer objects from the REE; and
   responsive to the second call, withdrawing the RW access to the stored frame buffer objects from the REE.

5. The method of claim 4, wherein withdrawing the RW access to the stored frame buffer objects from the REE comprises:
   updating a hardware page table attribute.

6. The method of claim 1, wherein processing the media asset in the REE of the electronic device in a first state comprises:
   generating earliest viable image (EVI) objects of the media asset.

7. The method of claim 6, wherein authenticating the processed media asset in the TEE comprises:
   generating thumbnail images of the EVI objects;
   attaching individual ones of the thumbnail images to corresponding EVI objects; and
   attaching metadata to the EVI objects, wherein the metadata comprises at least one of data, time, or depth information.

8. A system, comprising:
   one or more hardware processors; and
   one or more non-transitory machine-readable storage media encoded with instructions that, when executed by the one or more hardware processors, cause the system to perform operations for media asset capture and processing, the operations comprising:
   capturing a media asset in an electronic device;
   storing frame buffer objects of the captured media asset in a Trusted Execution Environment (TEE) of the electronic device;
   subsequent to storing the frame buffer objects, processing the media asset in a Rich Execution Environment (REE) of the electronic device in a first state with read-only (RO) access to the stored frame buffer objects and a second state with read-write (RW) access to the stored frame buffer objects;
   controlling, in the TEE, the RO and RW access by the REE to the stored frame buffer objects during processing of the media asset; and
   subsequent to processing the media asset, authenticating the processed media asset in the TEE.

9. The system of claim 8, wherein controlling the RO and RW access by the REE to the stored frame buffer objects comprises:
   receiving a first call sent by the REE to grant the RW access to the frame buffer objects to the REE; and
   responsive to the first call, granting the RW access to the stored frame buffer objects to the REE.

10. The system of claim 9, wherein granting the RW access to the stored frame buffer objects to the REE comprises:
    updating a hardware page table attribute.

11. The system of claim 9, wherein controlling the RO and RW access by the REE to the stored frame buffer objects further comprises:
    receiving a second call sent by the REE to withdraw the RW access to the frame buffer objects from the REE; and
    responsive to the second call, withdrawing the RW access to the stored frame buffer objects from the REE.

12. The system of claim 11, wherein withdrawing the RW access to the stored frame buffer objects from the REE comprises:
    updating a hardware page table attribute.

13. The system of claim 8, wherein processing the media asset in the REE of the electronic device in a first state comprises:
    generating earliest viable image (EVI) objects of the media asset.

14. The system of claim 13, wherein authenticating the processed media asset in the TEE comprises:
    generating thumbnail images of the EVI objects;
    attaching individual ones of the thumbnail images to corresponding EVI objects; and attaching metadata to the EVI objects, wherein the metadata comprises at least one of data, time, or depth information.

15. One or more non-transitory machine-readable storage media encoded with instructions that, when executed by one or more hardware processors, cause a system to perform operations for media asset capture and processing, the operations comprising:

capturing a media asset in an electronic device;

storing frame buffer objects of the captured media asset in a Trusted Execution Environment (TEE) of the electronic device;

subsequent to storing the frame buffer objects, processing the media asset in a Rich Execution Environment (REE) of the electronic device in a first state with read-only (RO) access to the stored frame buffer objects and a second state with read-write (RW) access to the stored frame buffer objects;

controlling, in the TEE, the RO and RW access by the REE to the stored frame buffer objects during processing of the media asset; and subsequent to processing the media asset, authenticating the processed media asset in the TEE.

16. The media of claim 15, wherein controlling the RO and RW access by the REE to the stored frame buffer objects comprises:

receiving a first call sent by the REE to grant the RW access to the frame buffer objects to the REE; and responsive to the first call, granting the RW access to the stored frame buffer objects to the REE.

17. The media of claim 16, wherein granting the RW access to the stored frame buffer objects to the REE comprises:

updating a hardware page table attribute.

18. The media of claim 16, wherein controlling the RO and RW access by the REE to the stored frame buffer objects further comprises:

receiving a second call sent by the REE to withdraw the RW access to the frame buffer objects from the REE; and responsive to the second call, withdrawing the RW access to the stored frame buffer objects from the REE.

19. The media of claim 15, wherein processing the media asset in the REE of the electronic device in a first state comprises:

generating earliest viable image (EVI) objects of the media asset.

20. The media of claim 19, wherein authenticating the processed media asset in the TEE comprises:

generating thumbnail images of the EVI objects;

attaching individual ones of the thumbnail images to corresponding EVI objects; and attaching metadata to the EVI objects, wherein the metadata comprises at least one of data, time, or depth information.

* * * * *